US008312465B2

(12) United States Patent
Pierce et al.

(10) Patent No.: US 8,312,465 B2
(45) Date of Patent: Nov. 13, 2012

(54) REAL-TIME CPU DISPATCHER AFFINITY RE-BALANCING

(75) Inventors: Bernard Pierce, Poughkeepsie, NY (US); Daniel V. Rosa, Highland, NY (US); Donald W. Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 1343 days.

(21) Appl. No.: 11/972,741

(22) Filed: Jan. 11, 2008

(65) Prior Publication Data

US 2009/0182978 A1 Jul. 16, 2009

(51) Int. Cl.
*G06F 9/46* (2006.01)
*G06F 15/173* (2006.01)

(52) U.S. Cl. ........ 718/105; 718/100; 718/104; 709/223; 709/224; 709/226

(58) Field of Classification Search .................. 718/100, 718/104, 105
See application file for complete search history.

(56) References Cited

U.S. PATENT DOCUMENTS

| | | | | |
|---|---|---|---|---|
| 6,026,425 A * | 2/2000 | Suguri et al. | ................... | 718/105 |
| 6,289,369 B1 * | 9/2001 | Sundaresan | ................... | 718/103 |
| 6,418,517 B1 * | 7/2002 | McKenney et al. | ............ | 711/151 |
| 6,633,897 B1 * | 10/2003 | Browning et al. | ............. | 718/103 |
| 6,965,930 B1 * | 11/2005 | Arrowood et al. | ............. | 709/223 |
| 7,203,944 B1 * | 4/2007 | van Rietschote et al. | ..... | 718/104 |
| 7,389,506 B1 * | 6/2008 | Miller et al. | ....................... | 718/1 |
| 7,533,168 B1 * | 5/2009 | Pabla et al. | .................... | 709/224 |
| 7,552,437 B2 * | 6/2009 | Di Luoffo et al. | ............. | 718/104 |
| 7,725,901 B2 * | 5/2010 | Gissel et al. | ................... | 718/105 |
| 2003/0200250 A1 * | 10/2003 | Kiick | .............................. | 709/102 |
| 2005/0108713 A1 * | 5/2005 | Geye et al. | ...................... | 718/100 |
| 2005/0155032 A1 * | 7/2005 | Schantz | ......................... | 718/100 |
| 2007/0124457 A1 * | 5/2007 | May et al. | ...................... | 709/224 |
| 2008/0046895 A1 * | 2/2008 | Dillenberger et al. | ......... | 718/105 |
| 2008/0184255 A1 * | 7/2008 | Watanabe et al. | .............. | 718/105 |
| 2009/0007133 A1 * | 1/2009 | Paul et al. | ...................... | 718/105 |

* cited by examiner

*Primary Examiner* — Emerson Puente
*Assistant Examiner* — Charles Swift
(74) *Attorney, Agent, or Firm* — Cantor Colburn LLP; William A. Kinnaman, Jr.

(57) ABSTRACT

A method and apparatus of operating a central processing unit (CPU) including a plurality of processors, is provided and includes collecting real-time statistics relating to the processors during dispatching activities, identifying give-help processors from the real-time statistics when the real-time statistics indicate that one or more of the nodes is overworked, and implementing help to be provided by the give-help processor to relieve the overworked node of a portion of the work to be distributed thereto.

17 Claims, 5 Drawing Sheets

REAL-TIME CPU DISPATCHER AFFINITY RE-BALANCING

BACKGROUND OF THE INVENTION

Aspects of the present invention are directed to a method and apparatus of operating a real-time central processing unit (CPU) dispatcher and, more particularly, to a method and apparatus of operating a real-time CPU dispatcher by reducing opportunities for processes or threads to be run on many different processors.

DESCRIPTION OF THE BACKGROUND

Recently, as high-end server architectures have been improved in terms of providing faster processing speeds and offering greater storage capacity, numbers of processors used by the servers have increased. As such, the processor "nest" needed to build large machines operating as servers continues to be made of smaller and smaller building blocks.

As these trends have continued, however, certain issues with server architectures have been made apparent. For example, as servers with relatively high gigahertz multi-node symmetric multi-processor (SMP) central electronic complexes (CECs) become more prevalent, the need to align the server's software's exploitation of the multi-node hardware cache becomes increasingly important. This is true because the penalty of cache missing, which occurs when a computing process for a CPU is not carried out on the most efficient cache available, significantly increases as processor speeds increase.

That is, traditionally the cache level is CPU specific with the L1 cache being small and very fast and the L2/L3 caches being generally shared across multiple CPUs and slower than the L1 cache especially as their respective levels and their respective distances from the CPUs they are associated with increase. As an example, the operation of accessing a single piece of data could take anywhere from 7 computational cycles on a local L1 cache to 300+ computing cycles on remote L2/L3 caches. In addition, since most multi-node SMP designs maintain all three levels of cache in nodes within the CEC, at some level, the node specific L2/L3 caches may be interconnected to allow cache hits to occur across nodes. These cache hits are called remote-node hits, and are generally slower because of the relative distance of the requestor CPU to the cache.

In addition, LPARs have traditionally been managed horizontally. While this method may have advantages as long as various LPARs do not have to compete for resources, if the LPARs have to compete for resources, operating LPARs in horizontal mode may be inefficient.

SUMMARY OF THE INVENTION

In accordance with an aspect of the invention, a method of operating a central processing unit (CPU) including a plurality of processors is provided. The method includes collecting real-time statistics relating to the processors during dispatching activities, identifying give-help processors from the real-time statistics when the real-time statistics indicate that one or more of the nodes, in which sets of the processors are arranged together, is overworked, and implementing help to be provided by the give-help processor to relieve the overworked node of a portion of the work to be distributed thereto.

In accordance with another aspect of the invention, a method of real-time rebalancing of dispatcher affinity of a central processing unit (CPU) including a plurality of processors is provided. The method includes collecting real-time statistics of processor conditions during dispatching activities that relate to an operation of the CPU, in which work is distributed across nodes defined in the CPU to each include a subset of the processors, analyzing the real-time statistics to identify one or more processors as being give-help processors when the real-time statistics indicate that one or more of the nodes is overworked, and implementing help to be provided by at least one of the give-help processors to relieve at least one of the overworked nodes of a portion of the work to be distributed thereto.

In accordance with another aspect of the invention, a computing environment in which work is dispatched to a central processing unit (CPU), including a plurality of processors, is provided. The computing environment includes a storage unit to store collected real-time statistics of processor conditions during dispatching activities that relate to an operation of the CPU, in which work is distributed relative to nodes to each include a subset of the processors, an analyzing unit to analyze the real-time statistics to identify one or more processors as being give-help processors when the real-time statistics indicate that one or more of the nodes is overworked, and an implementing unit to implement help to be provided by at least one of the give-help processors to relieve at least one of the overworked nodes of a portion of the work to be distributed thereto.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTIONS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

U.S. patent application Ser. No. 11/972,734 "ALGORITHM TO SHARE PHYSICAL PROCESSORS TO MAXIMIZE PROCESSOR CACHE USAGE AND TOPOLOGIES," filed on the same day as the present invention, describes creation of topology information and is incorporated herein in its entirety by reference.

Figure 1:
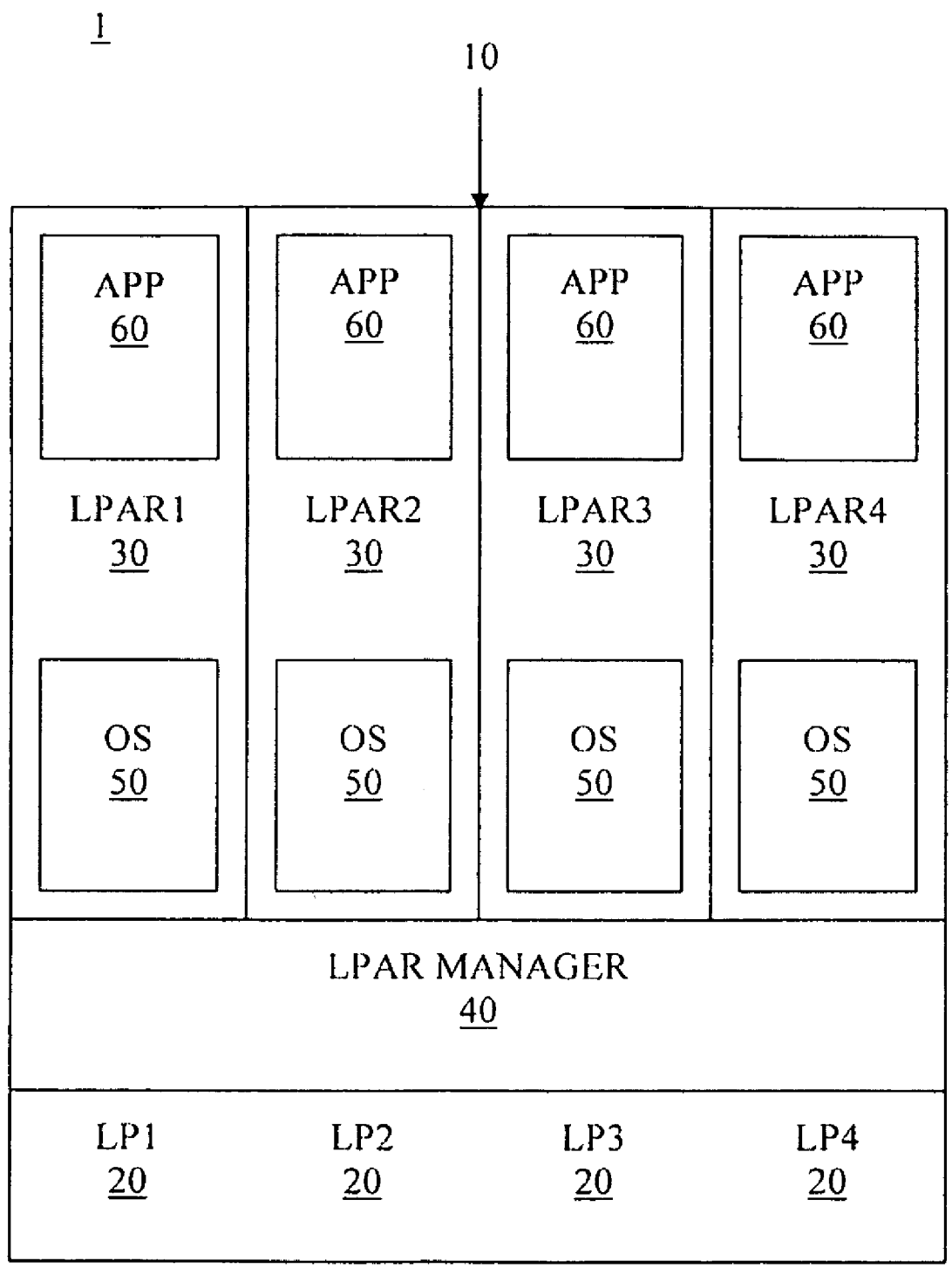
FIG. 1 illustrates a computing environment including logical partitions and logical processors in accordance with an embodiment of the invention.

With reference to FIG. 1, an apparatus 10, such as an SMP CEC, may be used in a computing environment 1 and may be employed to handle various types of computing requirements. As shown in FIG. 1, the apparatus 10 may comprise one or more logical processors LPs 20 and one or more logical partitions LPARs 30, each of which is configured (e.g., with an assigned weight) such that it has access to a predetermined share of processing resources of the LPs 20 in accordance with predefined instructions.

An LPAR manager 40 may be employed to determine an operational mode of each of the LPARs 30 and an amount, if any, of an existing excess of the share of the processing resources of the LPs 20. Additionally, the LPAR manager 40 may dispatch the processing resources of at least a subset of the LP's 20, such as any of the LPs 20 that are defined as being shared rather than dedicated, to the LPARs 30 in accordance with the respective predetermined shares and with respect to the determined operational mode of the respective LPARs 30 and the amount, if any, of the excess share.

The LPs 20 allow a partition to be able to use a processor, which may be physical processor that forms a part of the central processing unit of the apparatus 10. In particular, the LPs 20 may be general processors, z Application Assist Processors (zAAPs), which are processors that are dedicated to certain types of work (e.g. Java applications), z9 Integrated Information Processors (zIIPs), or other similar processors. Moreover, the LPAR manager (or the LPAR hypervisor) 40 may be embodied as software installed on a general-purpose machine or as software installed on a specific type of machine within the apparatus 10.

In particular, the apparatus 10 may contain many times more LPs 20 than LPARs 30. Further, it is noted that the apparatus 10 may be a high-end computer, such as a server to which several users may connect. In that capacity, each of the LPARs 30 may operate as instructed by an operating system (OS) 50 installed therein to perform various applications APP 60. The OS 50 and the APP 60 may be either specifically designed for use with individual LPARs 30 or applicable to pluralities of LPARs 30.

Figure 2:
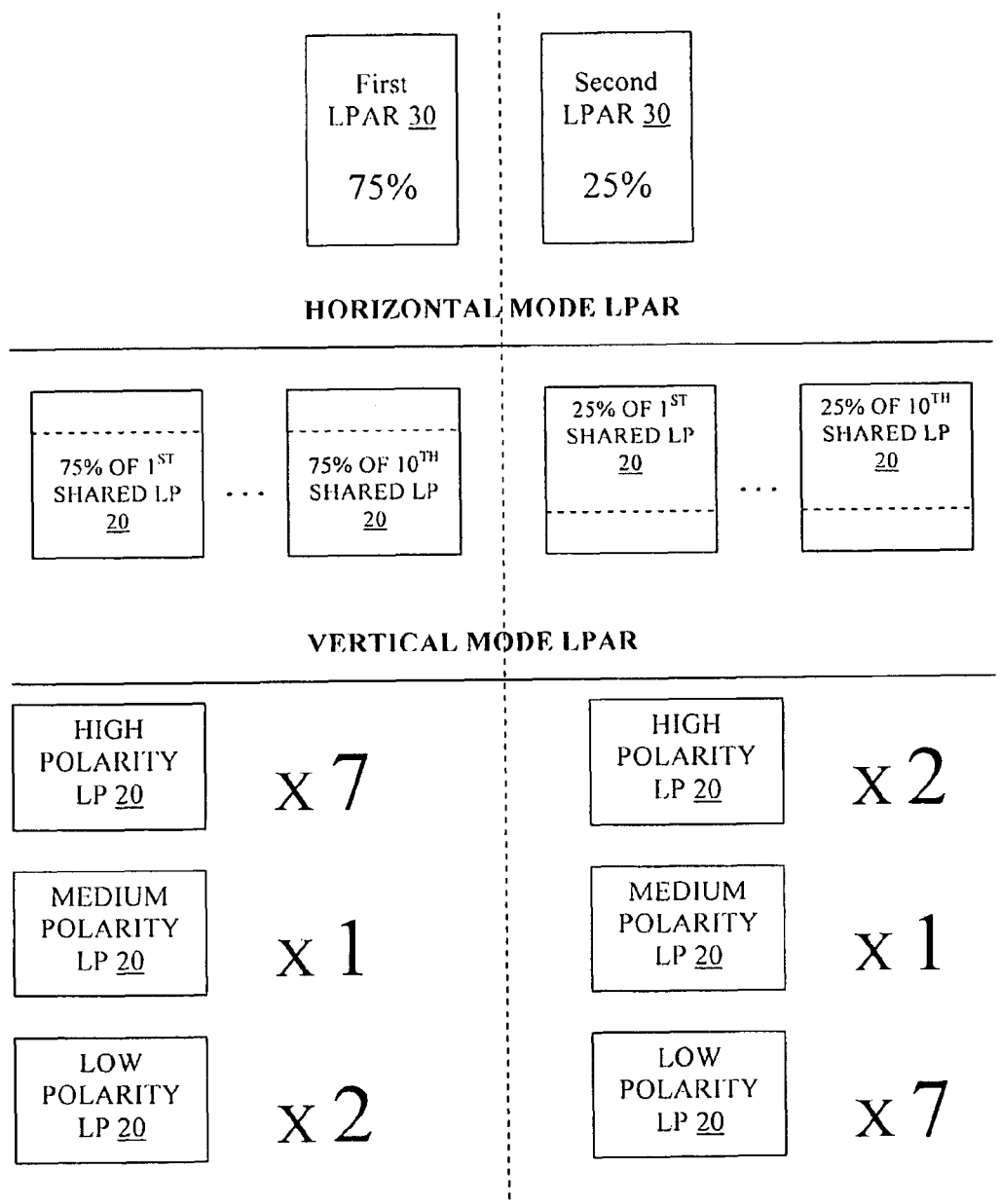
FIG. 2 is a diagram of a distribution to exemplary logical partitions running in horizontal and vertical modes in accordance with embodiments of the invention.

According to aspects of the invention, when setting up the apparatus 10, a user initially configures the LPARs 30 to have any number of LPARs 30 with each operating in variable modes and each having access to a configurable share of the processing resources. Thus, as shown in the exemplary diagram of FIG. 2, the apparatus 10 may comprise ten shared LPs 20 with the first and second LPARs 30 configured to have access to a 75% share of the processing resources of the LPs 20 and a 25% share, respectively.

In accordance with this example, the first and second LPARs 30 may operate in horizontal mode, in which the first LPAR 30 will have access to 75% of the processing resources of each of the ten shared LPs 20 and the second LPAR 30 will have access to 25% of the processing resources of each of the ten shared LPs 20. Alternatively, the first and second LPARs 30 may be configured to operate in vertical mode. Here, the first LPAR 30 will be assigned 7 high polarity LPs 20, 1 medium polarity LP 20 and 2 low polarity LPs 20 while the second LPAR 30 will be assigned 2 high polarity LP's 20, 1 medium polarity LP 20 and 7 low polarity LPs 20.

In this example, the high polarity LPs initially operate at 100% of the processing unit, which in the example translates to 10% of the total workload of the first and second LPARs 30, the medium polarity LPs 20 initially operate at a non-zero percentage (e.g., 50%) of the processing unit and the low polarity LPs 20 initially operate at 0% of the processing unit. Thus, the polarity of a particular LP 20 refers to an amount of a processing capacity of the LP that is dedicated to allowing a particular LPAR 30, to which the LP 20 has been dispatched, to access its respective share.

Figure 3:
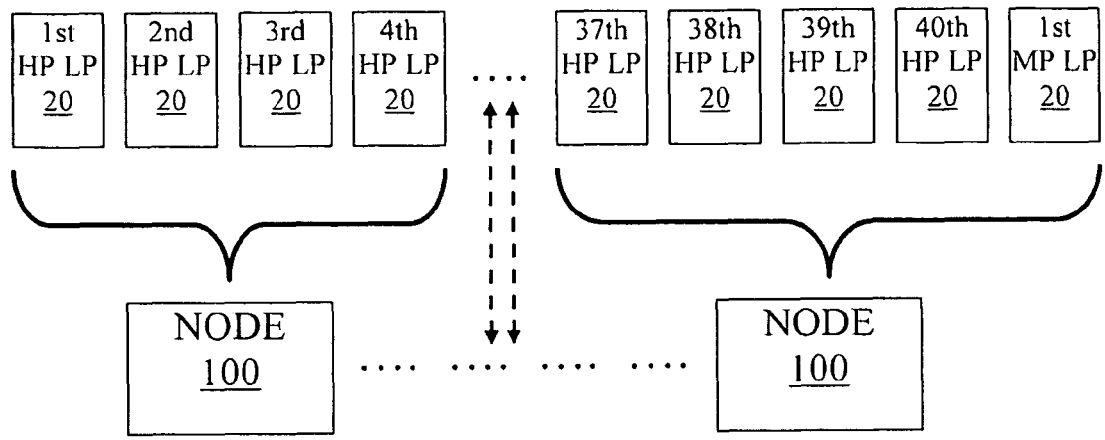
FIG. 3 is a diagram of an arrangement of logical processors in nodes.
Figure 4:
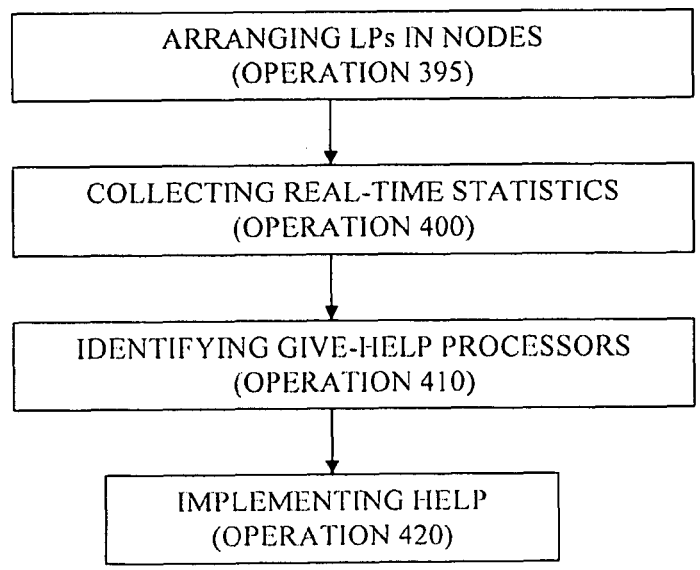
FIG. 4 is a flow diagram illustrating an exemplary method of operating a central processing unit (CPU) in accordance with an embodiment of the present invention.
Figure 5:
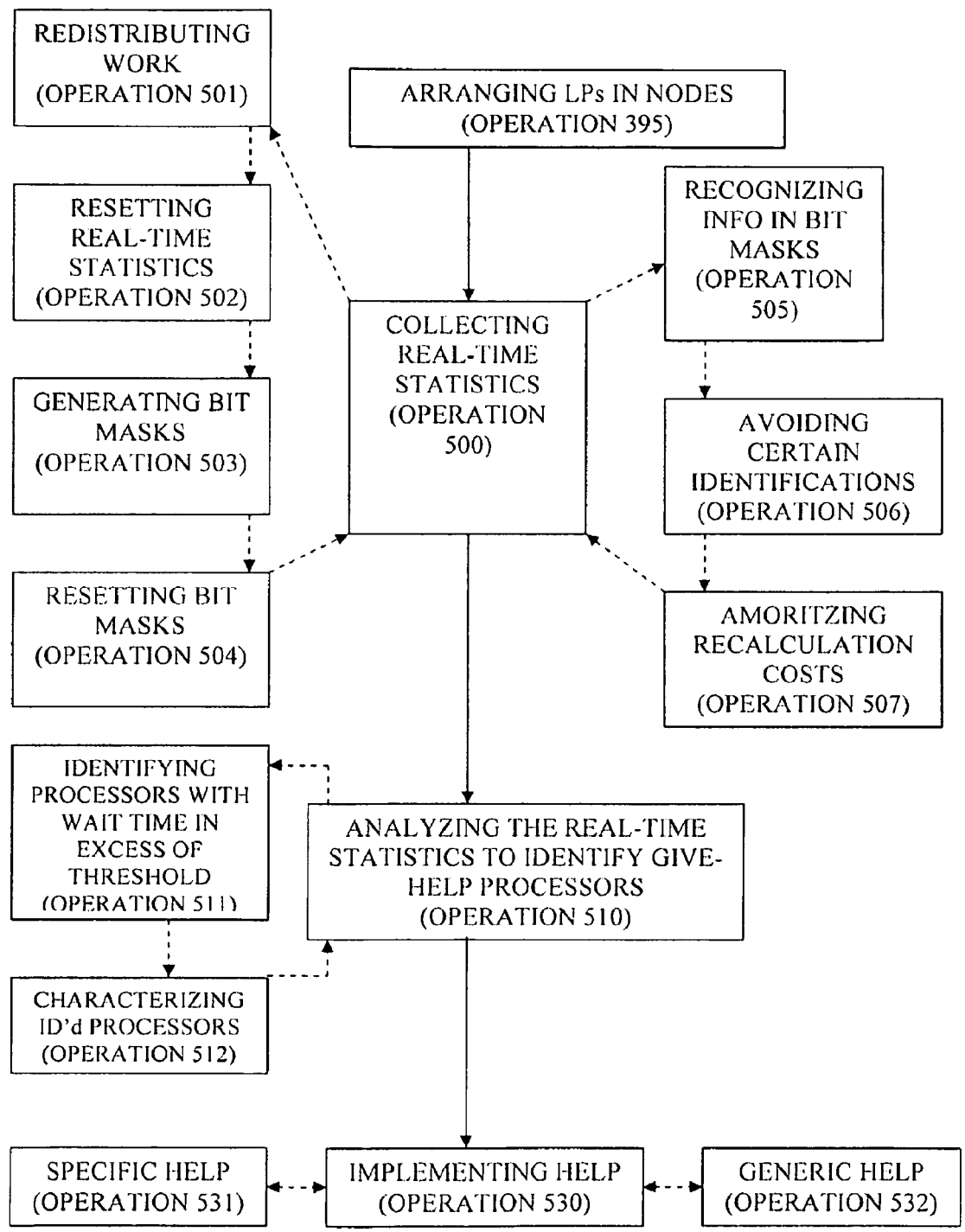
FIG. 5 is a flow diagram illustrating an exemplary method of operating a central processing unit (CPU) in accordance with another embodiment of the present invention.

With reference to the example shown in FIG. 3 and FIGS. 4 and 5, an exemplary LPAR 30 runs in vertical mode and includes 64 LPs 20, of which 40 are high polarity LPs 20, 1 is a medium polarity LP 20 and 23 are low polarity LPs 20. Here, the LPAR manager 40 is responsible for arranging some or all of the LPs 20 dispatched to the LPAR 30 in nodes 100 (operation 395) within the LPAR 30 (this would be true for an LPAR 30 running in horizontal mode as well).

The nodes 100 (or, alternately the affinity nodes 100) allow for a concentration of similarly situated LPs 20 to share processing resources (e.g., L2/L3 caches). Thus, in the example of FIG. 3, the operating system 50, with direction from the LPAR manager 40, arranges for at least 9 nodes 100 of 4 high polarity LPs 20 each and 1 node 100 of 4 high polarity LPs 20 and the 1 medium polarity LP 20.

The arranging of the LPs 20 (operation 395) includes automatically arranging the LPs 20 in accordance with computing conditions, and/or selectively arranging the LPs 20 in accordance with user instructions. The automatic arranging is in accordance with the operating system 50 software and the operation of the LPAR manager 40 as well as current computing conditions recognized by the LPAR manager 40 while the selective arranging is user implemented. In any case, once the LPAR manager 40 completes the arranging of the LPs 20 in the nodes 100, the operating system 50 distributes work across each of the nodes. Subsequently, the operating system 50 monitors the performance of the LPAR 30 and the nodes 100.

With reference to FIG. 4, it is noted that the monitoring can be considered as a method of operating a central processing unit (CPU), such as the SMP CEC, including a plurality of LPs 20. Here, the method includes collecting real-time statistics relating to the LP's 20 and their respective workloads during dispatching activities (operation 400), identifying give-help LPs 20 from the real-time statistics (operation 410) when the real-time statistics indicate that one or more of the nodes 100 is overworked, and implementing help to be provided by the give-help LP 20 (operation 420) to relieve the overworked node 100 of a portion of the work to be distributed thereto.

In greater detail and with reference to FIG. 5, the method may also be said to include collecting real-time statistics of LP 20 conditions (operation 500) during dispatching activities that relate to an operation of the CPU, in which work is distributed across affinity nodes 100 to each include a subset of the LPs 20, analyzing the real-time statistics to identify one or more LPs 20 as being give-help LPs 20 (operation 510) when the real-time statistics indicate that one or more of the nodes 100 is overworked, and implementing help to be provided by at least one of the give-help LPs 20 (operation 530) to relieve at least one of the overworked nodes 100 of a portion of the work to be distributed thereto.

With respect to the distribution of the work across the nodes 100, it is noted that the work is distributed by considering historical work consumption patterns of the LPs 20. The consideration of the consumption patterns is then applied by consistently redistributing the work across the nodes 100 in cyclic intervals (operation 501) with the real-time statistics reset for every distribution cycle (operation 502). This resetting accounts for the fact that the work may be distributed to different LPs 20 as a result of the redistribution. The real-time statistics may also comprise an amount of wait time that has accumulated for the LPs 20 of each of the nodes 100 and an importance rating for the work distributed to each of the nodes. Here, the real-time statistics are calculated at a higher frequency (e.g., a milli-second scale) than that of the cyclic intervals (e.g., at 2 second intervals).

In accordance with an embodiment of the invention, the collecting further includes generating summary bit masks (operation 503) and resetting the bit masks for each of the distribution cycles (504). The generating of the summary bit masks (operation 503) allows for an identification of each of the LPs 20 of the central electronic complex (CEC) and, more particularly, for an identification of those LPs 20 which are give-help LP 20 candidates as well as the LPs 20 of the overworked node 100.

Once the bit masks are generated for a current distribution cycle, information contained within the bit masks is recognized (operation 505). Based on the recognized information, an identification of the need-help LPs 20 as give-help LPs 20 may then be avoided (operation 506). This particularly serves as insurance against the placement of an additional burden upon an LP 20 of an already overworked node.

Here, it is noted that in an alternate embodiment of the invention, the summary bit masks may include information as to the importance rating of the work being handled by the LP 20. This information can then be used to identify a first need-help LP 20 as a give-help LP 20 if a second need-help LP 20 is identified as handling more important work than the first need-help LP 20.

In this embodiment, the bit masks can be modified in accordance with the importance ratings of work of the corresponding LP 20 so as to assign a privilege level to the corresponding LP 20. Here, a level of a difference in privileges between LPs 20 that allows for a need-help LP 20 to be identified as a give-help LP 20 may be predetermined. Thus, in this embodiment, a first need-help LP 20 is not prevented from giving help to a second need-help LP 20 if the second need-help LP 20 is executing work at a more privileged importance level.

In accordance with a further embodiment, it is understood that recalculating costs of maintaining the bit masks may be expensive in terms of processing resources. Here, however, the costs are amortized (operation 507) in accordance with the frequency of the calculating of the real-time statistics (operation 500) being sufficiently higher than the frequency of the cyclic intervals.

With respect to the operation of analyzing the real-time statistics (operation 510) to identify give-help LP's 20, the analyzing of the real-time statistics may include identifying those LPs 20 for which the amount of wait time exceeds a predetermined threshold (operation 511), and characterizing each of the identified LPs 20 as a give-help LP 20 (operation 512). In an embodiment of the invention, the predetermined threshold may be defined in accordance with user instructions or may be based upon current computing conditions. In addition, the predetermined threshold may be variable for each identified LP 20 based on the importance rating of the work being handled by the LP 20. That is, where two LPs 20 have a similar wait time, if a first one of the LPs 20 handles relatively important work as compared to the other, the wait time of the first LP 20 will be found to exceed the predetermined threshold while the same may not be true for the other LP 20.

In an embodiment of the invention, a subset of the give-help LPs 20 may share an L2/L3 cache with the overworked node and, in this case, the L2/L3 cache sharing LPs 20 are identified (e.g., by information contained within their respective bit masks) as optimal give-help candidates to actually provide the help to the overworked node 100 while those LPs 20 that do not share the L2/L3 cache are less optimal candidates. Here, information as whether LPs 20 share the L2/L3 cache may be provided by the LPAR manager 40 and is generally static. In accordance with this embodiment, by maintaining effectively two categories of give-help LPs 20, varying threshold values for information such as LP 20 wait times and importance rating can be employed to trigger the identification of only the local give-help LPs 20 as being the high priority LP 20 candidates.

With respect to the implementing of the help (operation 530), it is noted that the help to be provided by the give-help LPs 20 may be specific or generic. In the implementing of the specific help (operation 531), the give-help LP 20 is specifically selected. Here, in the selecting operation, the at least one give-help LP 20 may be selected to give help to a primary affinity node queue assigned to the overworked node. Conversely, in the implementing of the generic help (operation 532), the at least one give-help LP 20 is passively selected. In the implementing of the generic help (operation 532), the generic help to be provided by the give-help LP 20 is based upon the premise that LPs 20 may enter and leave respective wait modes frequently as part of normal dispatch activities. As such, LPs 20 entering a wait are more generally available and are good candidates as give-help LPs 20 at least with respect to other local LPs 20 whose node 100 is overworked.

Regarding the implementing of the specific help (operation 531), in the selecting of the at least one give-help LP 20, differences in privileges between each of the give-help LPs 20 are compared with one another. A give-help LP 20 with a significant amount of wait time or with lower or equal priority work is then chosen firstly from candidates within the same L2/L3 cache. Should a helper not be found there, give-help LPs 20 with a significant amount of wait time or lower priority outside L2/L3 cache of the node 100 seeking help are chosen. If the priority of work between the give-help LP 20's own node 100 and the node 100 being helped are substantially similar, the give-help LP 20 alternates between the work for each node 100.

In detail, it is noted that an intent behind the selecting of the at least one give-help LP 20 in operation 531 is to find a good candidate LP 20 that would be responsive to the over-worked node's 100 request for help. To that end, as discussed above, the identity of the give-help LP 20 is determined based on both its own statistics and those of the LPs 20 of the requesting node. This dual search may involve the operating system 50 comparing the dispatch priority of the top unit of work on each of the relevant nodes 100 and possibly dispatching an LP 20 as a give-help LP 20 from the node 100 having the unit of work with the more privileged dispatch priority.

In accordance with an aspect of the invention, a non-transitory machine-readable medium is provided as having instructions stored thereon to execute a method of operating a central processing unit (CPU) including a plurality of LPs 20.

Figure 6:
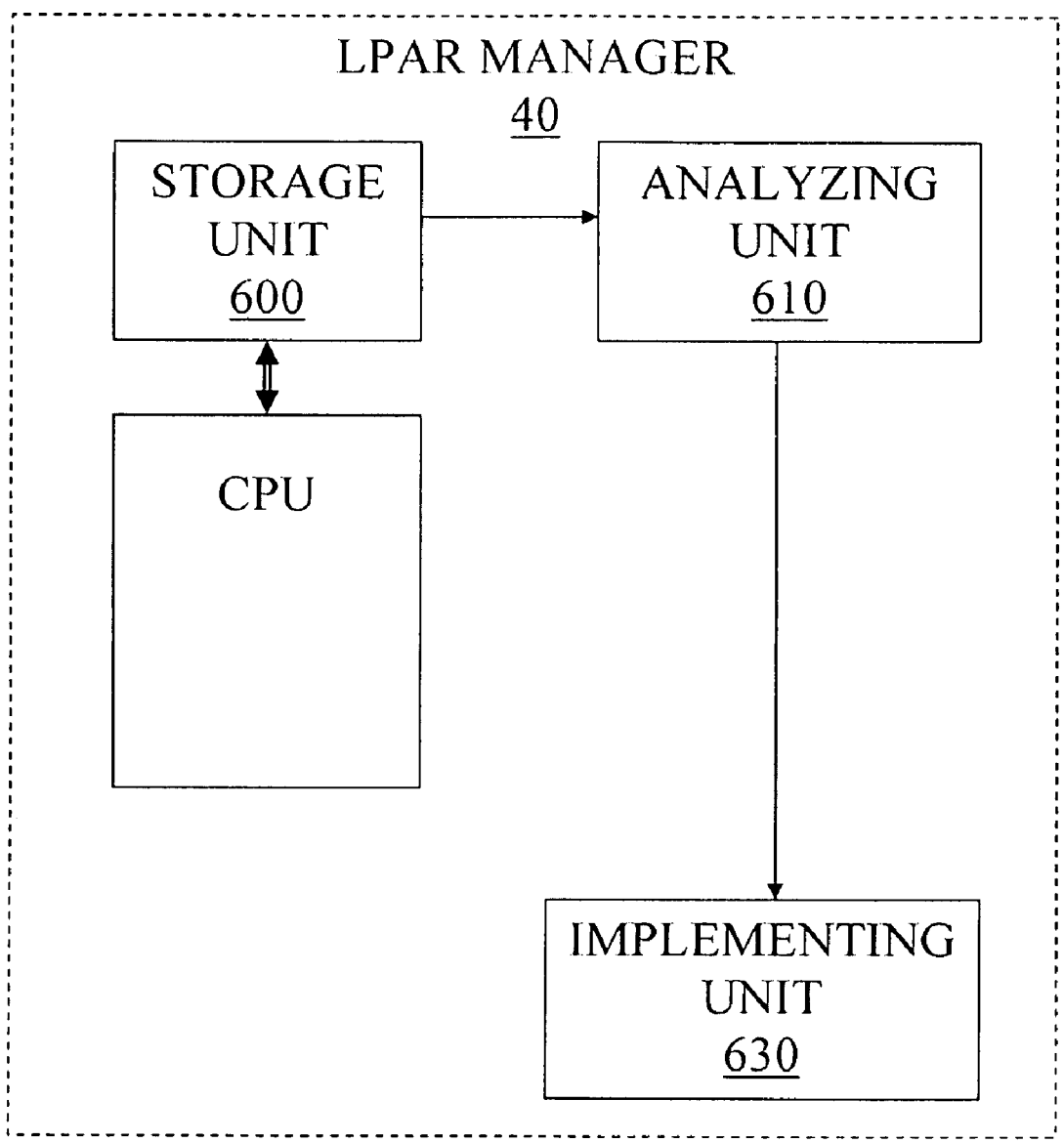
FIG. 6 is a schematic illustration of a logical partition manager in accordance with an embodiment of the invention.

In accordance with another aspect of the invention and with reference to FIG. 6, a computing environment in which work is dispatched to a processor level of a CEC, which includes LPs 20, is provided. The computing environment includes a storage unit 600 to store collected real-time statistics of LP 20 conditions during dispatching activities that relate to in operation of the CPU, in which work is distributed across nodes defined in the CPU to each include a subset of the LPs 20, an analyzing unit 610 to analyze the real-time statistics to identify one or more LPs 20 as being give-help LPs 20 when the real-time statistics indicate that one or more of the nodes is overworked, and an implementing unit 630. The implementing unit 630 implements help to be provided by at least one of the give-help LPs 20 to relieve at least one of the overworked nodes of a portion of the work to be distributed thereto.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. A method of operating a central processing unit (CPU) including a plurality of processors, comprising:
   collecting real-time statistics relating to each of the processors during dispatching activities;
   identifying one or more give-help processors from the real-time statistics when the real-time statistics indicate that one or more nodes, in which sets of the processors are arranged together, is overworked; and
   implementing help to be provided by at least one of the give-help processors to relieve at least one of the overworked nodes of a portion of work to be distributed thereto,
   the method further comprising arranging the processors in the nodes in accordance with computing requirements, computing conditions and user instructions prior to the collecting of the real-time statistics.

2. A method of real-time rebalancing of dispatcher affinity of a central processing unit (CPU) including a plurality of processors, comprising:
   collecting real-time statistics of processor conditions for each of the processors during dispatching activities that relate to an operation of the CPU, in which work is distributed across nodes defined in the CPU to each include a subset of the processors;
   analyzing the real-time statistics to identify one or more processors as being give-help processors when the real-time statistics indicate that one or more of the nodes is overworked; and
   implementing help to be provided by at least one of the give-help processors to relieve at least one of the overworked nodes of a portion of the work to be distributed thereto,
   the method further comprising arranging the processors in the set of nodes in accordance with computing requirements prior to the collecting of the real-time statistics, wherein the arranging of the processors comprises:
   arranging the processors in accordance with computing conditions; and
   selectively arranging the processors in accordance with user instructions.

3. The method according to claim 2, further comprising:
   redistributing the work across the nodes in cyclic intervals; and
   resetting the real-time statistics for every distribution cycle.

4. The method according to claim 3, wherein the real-time statistics comprise:
   an amount of wait time that has accumulated for the processors of each of the nodes; and
   an importance rating for the work distributed to each of the nodes.

5. The method according to claim 4, wherein the collecting of the real-time statistics proceeds at a higher frequency than a frequency of the cyclic intervals.

6. The method according to claim 5, wherein the collecting comprises:
   generating summary information to identify each of the processors of the CPU and to identify the give-help processors as such and the processors of the overworked node as need-help processors; and
   resetting the summary information for each of the distribution cycles.

7. The method according to claim 6, further comprising:
   recognizing information contained within the summary information;
   avoiding an identification of the need-help processors as give-help processors based on the recognized information; and
   amortizing recalculating costs of maintaining the summary information in accordance with the frequency of the calculating of the real-time statistics being sufficiently higher than the frequency of the cyclic intervals.

8. The method according to claim 5, wherein the collecting comprises generating summary information to identify each of the processors of the CPU and to identify the give-help processors as such and the processors of the overworked node as need-help processors for every importance rating.

9. The method according to claim 8, further comprising:
   recognizing information contained within the summary information; and
   avoiding an identification of the need-help processors as give-help processors based on the recognized information except where the importance rating of the work of the need-help processors is lower than that of other need-help processors by a predetermined difference.

10. The method according to claim 4, wherein the analyzing of the real-time statistics comprises:
    identifying those processors for which the amount of wait time exceeds a predetermined threshold; and
    characterizing each of the identified processors as a give-help processor.

11. The method according to claim 2, wherein the at least one of the give-help processors has a sufficiently large amount of wait time associated therewith and/or the work distributed thereto has a sufficiently low importance rating.

12. The method according to claim 2, wherein a subset of the give-help processors share an L2/L3 cache with an overworked node and are identified as high priority give-help processors.

13. The method according to claim 2, wherein the implementing of the help comprises:
    implementing specific help, in which the at least one give-help processor is specifically selected; and
    optionally implementing generic help, in which the at least one give-help processor is passively selected.

14. The method according to claim 13, wherein, in the selecting of the at least one give-help processor, priorities of each of the give-help processors are compared with one another and a highest priority give-help processor is selected.

15. The method according to claim 14, wherein, in the selecting of the at least one give-help processor, the at least one give-help processor is selected from a primary affinity node queue assigned to a less overworked node.

16. A computing environment in which work is dispatched to a central processing unit (CPU), including a plurality of processors,
    the processors being arranged in nodes in accordance with computing requirements, computing conditions and user instructions prior to a collection of real-time statistics of processor conditions,
the computing environment comprising:
a storage unit to store collected real-time statistics of processor conditions for each of the processors during dispatching activities that relate to an operation of the CPU, in which work is distributed across nodes defined in the CPU to each include a subset of the processors;
an analyzing unit to analyze the real-time statistics to identify one or more processors as being give-help processors when the real-time statistics indicate that one or more of the nodes is overworked; and
an implementing unit to implement help to be provided by at least one of the give-help processors to relieve at least one of the overworked nodes of a portion of the work to be distributed thereto.

17. The method according to claim 1, wherein the implementing comprises:
choosing a first give-help processor with a significant amount of wait time or a work priority that is substantially similar to that of the overworked nodes and that shares an L2/L3 cache with the overworked nodes, and
choosing a second give-help processor with a significant amount of wait time or a work priority that is lower than that of the overworked nodes and that is outside of the L2/L3 cache in an event the first give-help processor is not found.

* * * * *